April 25, 1967     A. FISCHER     3,315,580
CAMERA WITH FLASH APPARATUS Filed Jan. 30, 1963     3 Sheets-Sheet 1

INVENTOR.
ARTUR FISCHER
BY MICHAEL S. STRIKER,
ATTORNEY

April 25, 1967  A. FISCHER  3,315,580
CAMERA WITH FLASH APPARATUS
Filed Jan. 30, 1963  3 Sheets-Sheet 3

INVENTOR.
ARTUR FISCHER
BY MICHAEL S. STRIKER,
ATTORNEY

United States Patent Office 3,315,580
Patented Apr. 25, 1967

3,315,580
CAMERA WITH FLASH APPARATUS
Artur Fischer, Tumlingen, Kreis Freudenstadt,
Black Forest, Germany
Filed Jan. 30, 1963, Ser. No. 254,877
Claims priority, application Germany, Feb. 6, 1962,
F 35,948
18 Claims. (Cl. 95—11)

The present invention relates to cameras.

More particularly, the present invention relates to cameras which have a flash apparatus permanently connected therewith.

In cameras of this type the provision of a reflector which remains permanently connected with the camera results in the necessity of providing the reflector with a shape and size which is not ideal and also in leaving the reflector in a position where it projects from the camera so as to be undesirably exposed and so as to place the entire camera at a disadvantage as compared to conventional cameras.

It is accordingly a primary object of the present invention to provide a camera with a built-in flash apparatus which does not require a reflector which projects undesirably beyond the remainder of the camera when the camera is not in use.

Another object of the present invention is to provide a camera with a built-in flash apparatus which enables the exterior of the camera to differ very little, if any at all, from the exterior of a conventional camera which is not provided with a built-in flash apparatus.

Still another object of the present invention is to provide a camera of the above type with a reflector which will provide almost ideal, if not ideal, reflection of the light of a flash lamp during use of the flash apparatus, in spite of the fact that the flash apparatus does not project from the camera when the flash apparatus is not in use.

A further object of the present invention is to provide a camera of the above type with an arrangement of the components of the flash apparatus which makes the most of the available space so that the entire flash apparatus may be accommodated in an extremely small space.

Yet another object of the present invention is to provide a camera with a built-in flash apparatus which includes a movable reflector which can be used very advantageously to insert a flash lamp into a lamp holder of the flash apparatus.

Also, it is an object of the present invention to provide a camera with a flash apparatus which includes a reflector which can also be used very advantageously to actuate an ejector for ejecting a lamp from the lamp holder of the flash apparatus.

Furthermore, it is an object of the present invention to provide a camera with a built-in flash apparatus which includes a reflector which occupies in its operative position a space larger than that which it occupies in its inoperative position.

In addition, it is an object of the present invention to provide a camera of the above type with a built-in flash apparatus and with a structure which provides easy access, when desired, to a battery of the flash apparatus for replacing the battery when required.

The objects of the present invention also include the provision of structure capable of accomplishing all of the above objects and at the same time composed of simple, rugged elements which are inexpensive and which are very reliable in operation.

With these objects in view the invention includes, in a camera, a camera housing having an upper wall and a hollow enclosure carried by this upper wall and defining a chamber therewith. The flash apparatus includes a reflector, and a support means supports this reflector for movement with respect to the hollow enclosure into the chamber thereof to an inoperative position and out of the chamber to an operative position. The flash apparatus includes, in addition to the reflector, a plurality of components among which are a battery, a lamp holder, a condenser, and a resistor, and at least some of these components are located in this chamber with at least one of these components which is in the chamber extending into the reflector when the reflector is in its inoperative position, so that in this way an extremely compact assembly is provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 7 shows the structure of FIG. 6 with the reflector in its operative position and with a lamp located in a lamp holder, an in addition FIG. 7 shows the closed position of the door which gives access to the battery.

Figure 1:
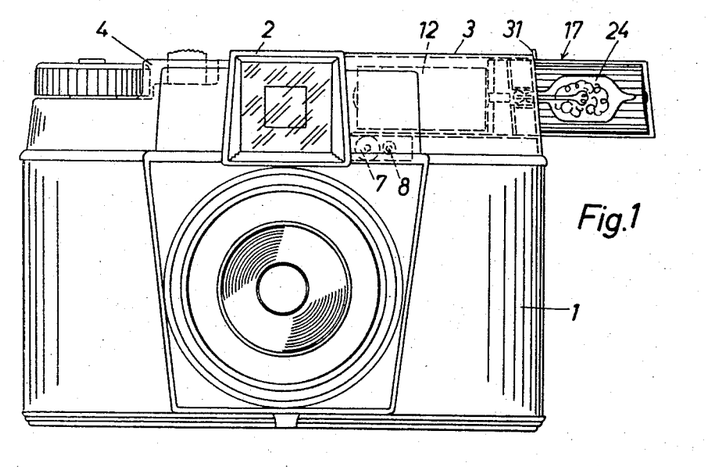
FIG. 1 is a front elevation of a camera according to the invention, the reflector of the flash apparatus of FIG. 1 being shown in FIG. 1 in its operative position with a lamp located therein.
Figure 2:
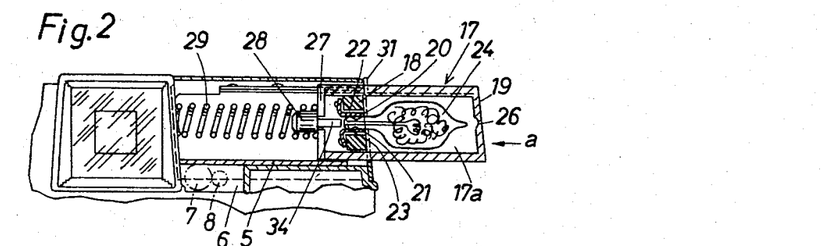
FIG. 2 is a fragmentary illustration of the camera of FIG. 1 with part of the flash apparatus shown in longitudinal section and with the reflector also located in its operative position.
Figure 3:
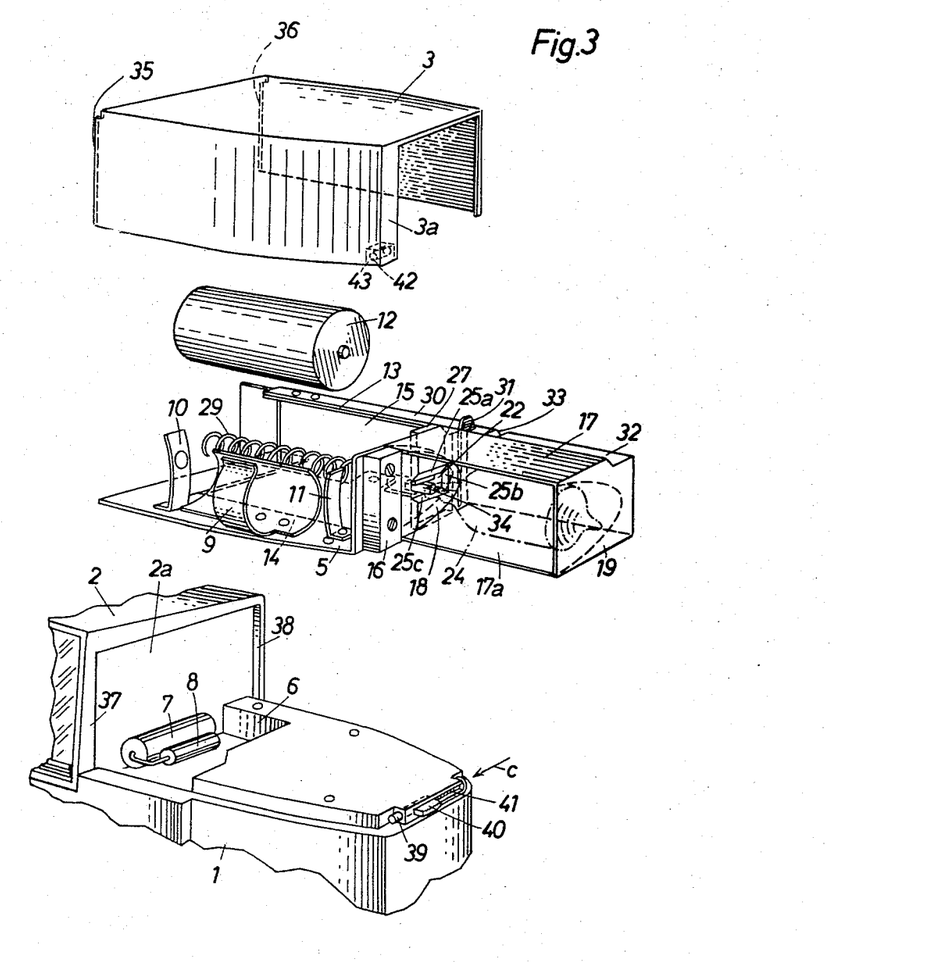
FIG. 3 is a perspective, exploded illustration of the flash apparatus of FIGS. 1 and 2, with the reflector also shown in its operative position, and FIG. 3 showing in addition part of the camera housing and also the enclosure which cooperates with the upper wall of the camera housing to define the chamber which receives elements of the flash apparatus.

Referring now to FIGS. 1–3, it will be seen that the camera illustrated therein includes a housing 1 the upper wall of which carries a viewfinder unit 2 as well as a pair of hollow enclosures 3 and 4. These hollow enclosures 3 and 4 define with the upper wall of the housing 1, at opposite sides of the viewfinder 2, chambers which contain various elements, and in the camera illustrated the flash apparatus has components located within the chamber defined by the hollow enclosure 3 and the upper wall of the camera housing 1. A support means is located in this latter chamber and includes a carrier member 5 which is fixedly screwed to the upper wall of the camera housing 1, and this support means 5 supports part of the flash apparatus. As may be seen from the lower part of FIG. 3, the upper wall of the camera housing 1 is formed with a recess 6 in which a condenser 7 and a resistor 8 of the flash apparatus are mounted. The carrier member 5 of the support means carries a springy battery holder 9 as well as springy contact strips 10 and 11 which respectively engage the ends of the battery 12 when the battery 12 is located within the holder 9. Moreover, the member 5 is provided with guiding portions 13 and 14 which together with the rear wall 15 of the member 5 and a guide member 16, fixed to a vertical right wall of the member 5, as viewed in FIG. 3, serve to guide the elongated reflector 17 of the flash apparatus for longitudinal movement. This elongated reflector 17 is of a generally rectangular outline and it has a channel-shaped reflecting surface 17a which is of parabolic cross section. The reflector 17 is provided with an upper rear edge portion 32 which is located at an elevation lower than the remainder of the upper surface of the reflector 17 and which slidably engages the guiding portion 13 of the member 5 so as to be guided thereby for longitudinal movement. The reflector 17 is shown in FIGS. 1–3 in its operative position where it extends outwardly beyond the chamber defined by the enclosure 3 and the housing 1, and in its operative position, the reflector 17 has the left end of its reflecting surface 17a limited by a transverse end wall 18 fixed to the carrier member 5 and forming part of a lamp-holding means. It will be noted that the wall 18 extends into the reflector 17 and has a periphery conforming to the cross section of the reflecting surface 17a. The other end of the reflecting surface 17a, its right end as viewed in FIGS. 1–3, is closed by a transverse end wall 19 of the reflector 17. The exterior surface of the guide member 16 is flush with the outer surface of the right end wall 3a of the enclosure 3 while the exterior surface of the wall 18 is located in a plane parallel to the exterior surface of the guide member 16 but to the left of the latter, as viewed in FIG. 3, by a distance equal to the thickness of the wall 19, and when the reflector 17 is displaced into the chamber to its inoperative position, the wall 19 engages the wall 18 and has its exterior surface flush with the exterior surface of the guide member 16 and the adjoining exterior surface of the wall 3a of the enclosure 3, so that in the inner, inoperative position of the reflector 17 no part of the flash apparatus projects outwardly beyond the enclosure 3. Those surfaces of the walls 18 and 19 which are directed toward each other are made shiny so as to be highly reflecting.

The wall 18 forms part of a lamp-holder means, as was pointed out above, and this wall 18 is formed with an opening 22 for receiving the base of a flash lamp. The wall 18 carries, as shown most clearly in FIG. 2, springy elements 20 and 21 which extend into the opening 22 and which serve both as holding springs and electrical contacts for the base 23 of the lamp 24, this base 23 extending into the opening 22 and being gripped by the springy electrical contact elements 20 and 21. The edge of the opening 22 which is located at that surface of the wall 18 which is directed toward the wall 19 is bevelled along at least part of its length so as to facilitate the insertion of the base 23 of the lamp 24 into the lamp-holder means. As is apparent from FIG. 3, the opening 22 is rectangular in cross section and the edge of the opening 22 which is located at the surface of the wall 18 which is visible in FIG. 3 is provided with bevelled portions 25a, 25b, and 25c along three of its sides. Actually, the reflector 17 is shown precisely in its operative position in FIGS. 1 and 2, while in FIG. 3 the reflector 17 is shown in a position located outwardly beyond the enclosure 3 to an extent greater than when the reflector 17 is in its operative position. The support means 5 supports the reflector 17 for movement not only between its operative and inoperative positions, but also to a third position located outwardly beyond its operative position, and the reflector 17 is shown in this third position in FIG. 3. In this latter position it is possible to introduce the lamp 24 into the reflector with the axis of the lamp extending generally parallel to the reflector, and then the reflector 17 can be moved inwardly toward its inoperative position with the end wall 19 engaging the end of the lamp 24 distant from its base 23 to insert the base 23 into the opening 22 of the lamp-holder means by movement of the reflector 17 back toward its inoperative position. In order to facilitate the centering and holding of the lamp 24 during the introduction of its base 23 into the lamp-holder means through such movement of the reflector 17, the surface of the wall 19 which is directed toward the wall 18 is formed with a depression 26 which receives an end of the lamp 24 so as to engage this end and thus facilitate the introduction of the base 23 into the lamp-holder means. Thus, this depression or recess 26 guarantees that after the lamp 24 is placed in the reflector when it is pulled out to its fullest extent, a subsequent movement of the reflector in the direction of the arrow as shown in FIG. 3 will guarantee that the lamp is held in such a way that its base 23 will be reliably guided by the bevelled surfaces 25a, 25b, 25c into the opening 22.

At its end which remains at all times in the chamber defined by the enclosure 3 on the upper wall of the camera housing 1, the reflector 17 carries a transverse wall 27 which engages the wall 18 to limit the outward movement of the reflector 17. This transverse wall 27 of the reflector 17 fixedly carries a pin 28 which extends into one end of a coil spring 29, so as to position and guide the latter, and one end of the spring 29 engages the wall 27 while the other end of the spring 29 engages the side wall 2a of the housing of the viewfinder assembly 2 so that in this way a spring means is provided for urging the reflector 17 in a direction opposite to that indicated by the arrow a in FIG. 2 to its outer operative position.

A releasable holding means is provided for holding the reflector 17 in its inner, inoperative position in opposition to the spring 29, and this releasable holding means, in the illustrated example, takes the form of an elongated leaf spring 30 fixed at its left end, as viewed in FIG. 3, to the elongated guiding portion 13 of the support member 5, and at its end 31, which is always accessible at the exterior, the leaf spring 30 has a downwardly directed projection which snaps over the exterior surface of the wall 19 when the operator has pushed the reflector 17 all the way back to its inoperative position, and thus the spring 30 will maintain the reflector 17 in its inoperative position. The operator need only grasp the end 31 of the leaf spring 30 and raise this end 31 to displace the downwardly directed projection at the free end of the spring 30 from the exterior surface of the wall 19 so as to release the reflector to the spring 29 which will advance the reflector outwardly toward its operative position. Thus, the releasable holding means 30 guarantees that the reflector 17 remains in its inner, inoperative position when the camera is not in use. At its rear upper edge portion 32, the reflector 17 is provided with a substantially V-shaped notch 33 into which the downwardly directed projection at the free end of the spring 30 snaps when the reflector 17 reaches its operative position, and in this way the releasable holding means 30 also serves to releasably hold the reflector 17 in its operative position. Thus, when the operator displaces the projection at the end of the spring 30 from the exterior surface of the wall 19 and releases the spring 30, the spring 29 will continue to advance the reflector 17 outwardly until the free end of the spring 30 snaps into the notch 33 so as to automatically locate the reflector 17 in its operative position, and it will be noted that in this position the inner transverse wall 27 of the reflector 17 has not yet reached the wall 18.

The pin 28 is fixed to the left surface of the end wall 27, as viewed in FIG. 2, and this pin 28 fixedly carries a projection 34 extending along the axis of the lamp 24 through an opening of the wall 27 to the right thereof, as indicated in FIG. 2, and this pin 34 forms an ejector means capable of being actuated by the reflector 17 for ejecting the lamp 24. It will be noted that in the operative position of the reflector 17, the ejector pin 34 is spaced from the base 23 of the lamp 24. After an exposure has been made the operator need only raise the end 31 of the spring 30 out of the notch 33 so that the spring 29 is now capable of advancing the reflector 17 all the way up to its outermost position shown in FIG. 3, where the wall 27 engages the wall 18, and during this movement of the reflector 17 outwardly beyond its operative position the ejector means 34 will engage the base 23 of the lamp and will shift the lamp 24 outwardly from the lamp-holder means, the lamp now simply resting in the reflector 17 engaging the inner surface 17a thereof. The operator need only tilt the camera downwardly in order to drop the burnt-out lamp 24 from the reflector and a fresh lamp can be immediately placed in the reflector 17 when it is in the position shown in FIG. 3, assuming that the next exposure is to be made with flash illumination and very shortly. It will be noted that in this way the burnt-out lamp need not even be engaged by the hand of the operator and will simply fall into the reflector 17 and can be easily dropped out of the latter. If it is desired to terminate the operation of the camera the operator will then immediately move the reflector 17 all the way into its inoperative position where the projection 31 will snap over the surface of the wall 19 in the manner described above. On the other hand if the operator desires to make another exposure with flash illumination he will simply place a second lamp in the reflector, will hold the free end of the spring 30 out of the notch 33 while pushing the reflector 17 back toward its inoperative position to an extent which locates the notch 33 somewhat beyond the free end of the spring 30 in the interior of the enclosure 3, and the operator will feel when the base 23 of the lamp 24 has been securely placed within the opening 22, whereupon the operator will release the spring 30 and the reflector 17 so that the spring 29 will automatically displace it back out to its operative position with the projection at the end of the spring 30 entering into the notch 33 for automatically locating the reflector 17 in its operative position indicated in FIGS. 1 and 2.

It will of course be necessary to change the battery 12 from time to time, and for this purpose the enclosure 3 is mounted on the camera in such a way that it can quickly and easily be removed so as to give access to the battery 12. It should be also noted that not only does the lamp-holder means 18 extend at all times into the interior of the reflector 17, but also when this reflector 17 is in its inner, inoperative position a part of the battery 12 extends into the interior of the reflector 17, so that an extremely compact assembly is provided, and it is easiest to remove the battery 12 not only when the enclosure 3 is removed but also when the reflector 17 has been displaced out to its operative position, so as to give the freest possible access to the battery 12. For the purpose of rendering the enclosure 3 removable, the left ends of the front and rear walls thereof, as viewed in FIG. 3, are provided with edge portions 35 and 36 which are respectively received in the space between the wall portions 37 and 38 which define part of a recess formed in the wall 2a of the viewfinder assembly 2. Thus, the ends 35 and 36 of the front and rear walls, respectively, of the enclosure 3 will be received between the wall portions 37 and 38 and will slidably engage these wall portions. Moreover, the structure includes a means for releasably holding the enclosure 3 in its position connected with the camera housing 1, and for this purpose the upper wall of the camera housing 1 is formed with a bore receiving a pin 39 which is urged by a spring 41 in the direction of the arrow c, the upper wall of the housing 1 being formed with an elongated slot communicating with the bore which receives the pin 39 and the spring 41, and a fin 40 is fixed to the pin 39 and extends through this slot so as to be accessible at the exterior of the camera, the bore which receives the spring 41 being closed at its rear end in any suitable way so that the spring 41 urges the pin 39 forwardly until the fin engages the front end of the slot through which this fin extends. Thus, the operator need only move the fin 40 in a direction opposite to that indicated by the arrow c in order to retract the pin 39. The enclosure 3 carries a block 43 formed with a bore 42 which receives the pin 39 when the enclosure 3 is mounted on the upper wall of the camera housing 1 with the bore 42 aligned with the pin 39, the spring 41 automatically advancing the pin 39 into the bore 42 for releasably holding the enclosure 3 in its position covering the flash apparatus. In order to remove the enclosure 3 it is therefore only necessary for the operator to advance the fin 40 rearwardly in opposition to the spring 41 until the pin 39 moves out of the opening 42, and then the enclosure 3 can quickly be removed to give access to the battery 12 as well as to the remainder of the apparatus.

The electrical connections of the various components of the flash apparatus as well as their electrical connection with the contact structure located in the shutter assembly of the camera are conventional and therefore are not illustrated.

Figure 4:
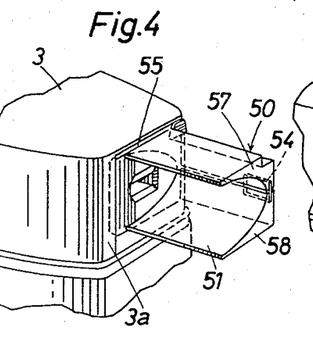
FIG. 4 is a fragmentary perspective illustration of another embodiment of a structure according to the invention, the reflector of FIG. 4 being shown between its operative and inoperative positions.
Figure 5:
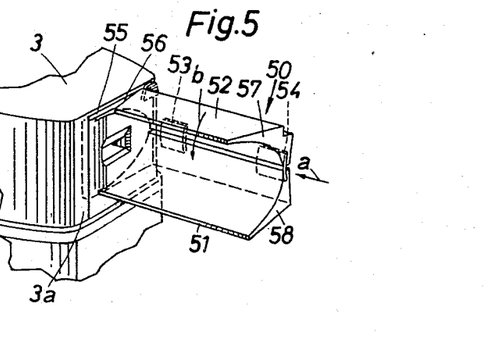
FIG. 5 shows the structure of FIG. 4 with the reflector thereof advanced all the way to its operative position.

The embodiment of the invention which is illustrated in FIGS. 4 and 5 differs from that of FIGS. 1-3 principally with respect to the structure of the reflector. The reflector 50 of the embodiment of FIGS. 4 and 5 is made up of a pair of longitudinal reflector sections 51 and 52 which are separated from each other by a longitudinal gap extending along the apex of the parabola formed by the cross-sectional configuration of the reflecting surface of the elongated, channel-shaped reflector 50. The reflector section 51 is guided for movement by substantially the same structure as that which guides the reflector 17. A leaf spring means interconnects the pair of reflector sections 51 and 52, and this leaf spring means is made up, in the illustrated example of a pair of elongated leaf springs 53 and 54 which on the one hand act as hinges for turnably interconnecting the reflector section 52 to the reflector section 51 and on the other hand as springs urging the reflector section 52 to the position shown in FIG. 5 from the position shown in FIG. 4. With this embodiment, it is only the reflector section 51 which carries at its inner end a transverse wall substantially identical with the wall 27 and acting in the same way to limit the outward movement of the reflector 50 as well as to support an ejector means for ejecting a lamp. With the embodiment of FIGS. 4 and 5, however, there is nothing corresponding to the end wall 19, but since the free end of the reflector 50 is open the operator can easily engage the end of the lamp to insert its base into the lamp-holder means. A releasable holding means formed by a spring 30 identical with that of FIGS. 1-3 is provided and cooperates with the upper rear edge portion of the reflector element 52 which is constructed in the same way as the upper rear edge portion of the reflector 17. Because the spring 30 is located directly over the leaf springs 53 and 54, this spring 30 does not influence the turning of the reflector section 52 by the leaf spring means 53 and 54. It will be noted that each of the elongated leaf springs 53 and 54 is fixedly connected at its opposite side edges to the pair of reflector sections 51 and 52, respectively.

When the reflector 50 is in its outer, operative position, the section 52 thereof is completely displaced out of the chamber defined by the enclosure 3 and the upper wall of the housing 1, while the reflector section 51, of course, still extends into this chamber since it fixedly carries a wall similar to the stop-wall 27 described above. In order to facilitate the movement of the reflector 50 back into the chamber to its inoperative position, the edge 55 of the opening of the wall 3a through which the reflector extends is bevelled, and furthermore the edge 56 at the left end of the reflector section 52 is inclined with respect to the direction of movement a of the reflector back to its inoperative position, with the front end of the edge 56 located at a greater distance from the wall 3a than the rear end of the edge 56. As a result when the operator shifts the reflector 50 in the direction of the arrow a shown in FIG. 5, the rear end portion of the edge 56 will first engage the bevelled edge 55 of the enclosure 3 while this bevelled edge 55 will progressively engage portions of the edge 56 which approach the front end thereof, with the result that the edge 55 will automatically turn the reflector section 52 in the direction of the arrow b shown in FIG. 5, in opposition to the leaf springs 53 and 54, in response to inward movement to the reflector 50 back toward its inoperative position. This turning of the reflector section 52 continues until the front end of the reflector edge 56 moves up to the edge 55, and then the reflector sections will remain in the position indicated in FIG. 4 where the reflector section 52 is of course closer to the section 51 than in the position shown in FIG. 5, so that when the reflector 50 is in its inoperative position it occupies less space than in its operative position, and in this way it is possible for the reflector to automatically open so as to provide more efficient reflection in its operative position while occupying a lesser amount of space in its inoperative position.

It should be noted that with the embodiment of FIGS. 4 and 5, when the reflector 50 reaches its inner, inoperative position, the free end of the leaf spring 30 will snap over the exterior surface 57 of the reflector section 52, and in this inner, inoperative position of the reflector 50, the end surfaces 57 and 58 of the reflector sections, while still exposed, are flush with the exterior surface of the wall 3a of the enclosure 3 as well as with the exterior surface of the wall 18 of the lamp-holder means, this wall 18 in this case being flush with the exterior surface of an element which corresponds to the guide member 16 and which is not illustrated in FIGS. 4 and 5. This construction of FIGS. 4 and 5 also can be provided with a releasable lock means for releasably locking the camera enclosure member 3 on the top wall of the camera housing in the manner described above in connection with FIG. 3.

Except for the above differences, the embodiment of FIGS. 4 and 5 is identical with that of FIGS. 1–3.

Figure 6:
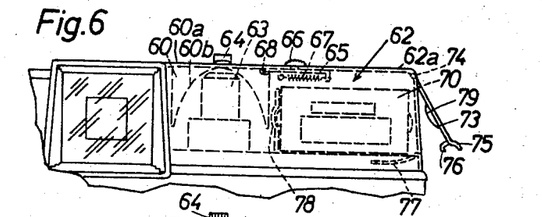
FIG. 6 is a fragmentary front elevation showing another embodiment of a flash apparatus according to the invention with the camera structure which is located adjacent the flash apparatus, the structure being shown in FIG. 6 with the reflector in its inoperative position and with a door which gives access to a battery being shown in its open position.
Figure 7:
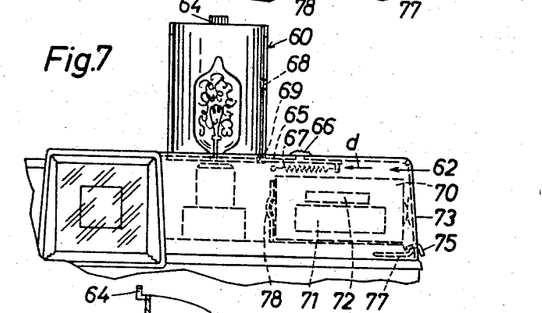
Figure 8:
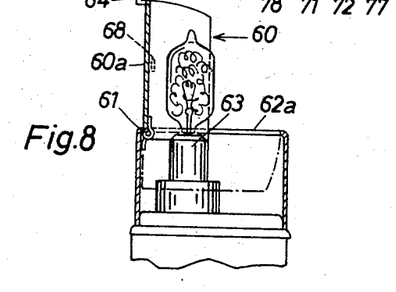
FIG. 8 is a transverse section of the structure of FIG. 7 also showing the reflector in its operative position and the lamp holder with a lamp therein.

With the embodiment of the invention which is illustrated in FIGS. 6–8, the enclosure 62, which corresponds to the enclosure 3, defines with the upper wall of the camera housing a chamber into which the reflector 60 moves to its inoperative position and out of which it moves to its operative position, but in this embodiment the mounting means does not mount the reflector for longitudinal movement and instead pivotally connects the reflector 60 to the enclosure 62 for turning movement between its operative and inoperative positions. Thus, the mounting means in this case takes the form of a hinge 61 (FIG. 8) connected with the upper wall 62a of the enclosure 62, this upper wall 62a being formed with an opening through which the reflector 60 moves between its operative and inoperative positions. In the inoperative position of the reflector 60 shown in FIG. 6, the exterior upper surface 60a of the reflector 60 is flush with the exterior upper surface of the upper wall 62a of the enclosure 62. The reflector 60 is also in the form of an elongated member of channel-shaped configuration having an inner reflector surface 60b which is of parabolic cross section. In its operative position, the elongated reflector 60 extends parallel to the axis of a lamp carried by the stationary lamp-holder means 63 which is fixed to the top wall of the camera housing and located in the interior of the chamber defined between this top wall and the enclosure 62 In its inoperative position the reflector 60 extends around the lamp-holder means 63, so that in this case also a component of the flash apparatus, namely the lamp-holder means 63, extends into the reflector in the inoperative position of the latter to provide a compact assembly. A projection 64 is fixed to the exterior surface 60a of the reflector 60 and is accessible to the operator to facilitate movement of the reflector 60.

A releasable holding means engages the reflector 60 for releasably holding it in its inoperative position shown in FIG. 6. This releasable holding means includes the elongated slide member 65 located at the underside of the top wall 62a of the enclosure 62. The elongated slide member 65 fixedly carries a pin which extends through an elongated slot formed in the wall 62a and extending to the right and left, as viewed in FIG. 6, and this pin is fixed, at the exterior of the wall 62a, to a handle 66 whose width is greater than that of the slot so that in this way the operator can move the slide member 65 and also the handle 66 will maintain the slide member 65 at the elevation illustrated in FIG. 6. A spring 67 is connected at its left end, as viewed in FIG. 6, to a stationary pin carried by the wall 62a and at its right end to the right end of the slide member 65 so as to urge the latter to the left, to the position illustrated in FIG. 6, and in this position the left free end of the slide member 65 extends into an opening 68 which is formed in the reflector 60, so that in this way the slide member 65 releasably holds the reflector 60 in its inoperative position. When it is desired to move the reflector 60 to its operative position the operator need only move the handle 66 to the right, as viewed in FIG. 6, and then the operator can engage the projection 64 in order to turn the reflector 60 up to its operative position illustrated in FIGS. 7 and 8. The reflector 60 is formed with an additional opening 69 which receives the free end of the slide member 65 when the reflector 60 is in its outer, operative position, and in this way the releasable holding means also acts to retain the reflector 60 in its operative position. The spring 67 urges the member 65 in the direction of the arrow d shown in FIG. 7, and whenever the operator wishes to move the reflector 60 from one of its positions to the other of its positions the operator will simply move the handle 66 in a direction opposite to that indicated by the arrow d, so as to place the releasable holding means in its release position releasing the reflector 60 for movement. Of course, it is also possible to provide the embodiment of FIGS. 6–8 with a spring means engaging the reflector 60 for moving it to its operative position, in which case the opening 69 need not be provided, and such a spring can, for example, take the form of a spring coiled about a hinge pin of the hinge 61 and having free ends respectively engaging the inner surface of the reflector 60 and the inner surface of the rear wall of the enclosure 62. In this case the rear edge of the opening of the wall 62a in which the reflector 60 turns acts as a stop limiting the turning of the reflector 60 in a counterclockwise direction, as viewed in FIG. 8.

Within the chamber defined between the enclosure 62 and the upper wall of the camera housing, there is a sufficient space, at the right of the reflector 60, as viewed in FIG. 6, to accommodate flash apparatus components such as the battery 70, the condenser 71, and the resistor 72, diagrammatically indicated in FIGS. 6 and 7. In order to give access to the battery 70 so as to be able to change it when required, instead of rendering the enclosure 62 entirely movable away from the upper wall of the camera housing, as was the case with the embodiments of FIGS. 1–5, only a part of the enclosure 62 is constructed so as to be movable away from the upper wall of the camera housing, and this movable part takes the form of a door 73 which forms part of the right end wall of the enclosure 62, as viewed in FIG. 6, and this door 73 is connected by a hinge 74, extending along the upper edge of the door 73, to the remainder of the enclosure 62. The door 73 is provided at its lower edge with a projection 75 which serves as a handle to facilitate turning of the door 73 by the operator. Moreover, there is fixed to the lower edge of the door 73 a hook-like projection 76 which snaps over a projection located at the free end of an elongated leaf spring 77 which is fixed at its left end, as viewed in FIGS. 6 and 7, to the upper wall of the camera housing. Thus, when the operator turns the door 73 to its closed position, shown in FIG. 7, the projection 76 will simply snap over the free end of the spring 77 to be releasably held thereby, and thus a releasable holding means is provided for releasably holding the door 73 in its closed position closing the chamber defined by the enclosure 62 and the upper wall of the camera housing and preventing access to the components of the flash apparatus. The operator may, however, at any time pull on the handle 75 with the force required to displace the projection 76 beyond the spring 77 so as to release the door 73 which may be turned upwardly to its open position. Instead of a releasable holding means in the form of a detent structure 76, 77 it is also possible to provide a releasable holding means in the form of a lock structure as shown in FIG. 3 and described above in connection with elements 39–43. In order to facilitate the removal of the battery 70, one of the contact springs which electrically engages an end of the battery 70 is formed by a contact spring 79 carried by the door 73 at its inner surface. The other contact spring 78 is located in the interior of the chamber. Thus, the movement of the door 73 to its open position displaces the contact 79 away from the battery so as to give free access to the latter. Preferably the contact spring 79 is grounded while the spring 78 is insulated from the camera housing.

With the embodiment of FIGS. 6–8 the operator will first turn the reflector 60 to its operative position and will then introduce a lamp into the lamp-holder means 63, and of course the lamp must be removed before the reflector 60 can be returned to its inoperative position.

Of course, it is possible to vary some of the details described above while still remaining within the scope of the invention. For example, while embodiments have been specified in which the reflector either shifts exclusively in a longitudinal direction or only about an axis, it is possible to provide a structure where the reflector executes a combination of turning and shifting movement while being displaced between its operative and inoperative positions.

It will be understood that each of the elements described above, or two or more together, may also find a useful application in other types of cameras differing from the types described above.

While the invention has been illustrated and described as embodied in cameras with flash apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having an upper wall; a hollow enclosure carried by said upper wall of said camera housing and defining a chamber with said upper wall of said camera housing; a reflector forming part of a flash apparatus; and support means supporting said reflector for movement with respect to said enclosure into said chamber to an inoperative position and out of said chamber to an operative position, said flash apparatus including, in addition to said reflector, a plurality of stationary components operatively connected to each other and among which are a battery, a lamp holder, a condenser, and a resistor, at least some of said components being located in said chamber and at least one of said components extending into said reflector when the latter is in said inoperative position thereof.

2. In a camera, in combination, a camera housing having an upper wall; a hollow enclosure carried by said upper wall of said camera housing and defining a chamber with said upper wall of said camera housing; a reflector forming part of a flash apparatus; and support means supporting said reflector for movement with respect to said enclosure into said chamber to an inoperative position and out of said chamber to an operative position, said flash apparatus including, in addition to said reflector, a plurality of stationary components operatively connected to each other and among which are a battery, a lamp holder, a condenser, and a resistor, at least some of said components being located in said chamber and at least one of said components extending into said reflector when the latter is in said inoperative position thereof, and said reflector having, in its inoperative position, an exposed surface which is flush with outer, exposed surface portions of said enclosure which adjoin said exposed surface of said reflector.

3. In a camera, in combination, a camera housing having an upper wall; an enclosure carried by said upper wall of said camera housing and defining with said upper wall a hollow chamber; an elongated, channel-shaped reflector forming part of a flash apparatus; and support means supporting said reflector for movement with respect to said enclosure into said chamber to an inoperative position and out of said chamber to an operative position, said flash apparatus including, in addition to said reflector, a plurality of stationary components operatively connected to each other and among which are a battery, a condenser, and a resistor, at least some of said components being located in said chamber and at least one of said components extending into said reflector when said reflector is in said inoperative position thereof.

4. In a camera, in combination, a camera housing having an upper wall; an enclosure carried by said upper wall of said camera housing and defining with said upper wall a hollow chamber; an elongated, channel-shaped reflector forming part of a flash apparatus; and support means supporting said reflector for movement with respect to said enclosure into said chamber to an inoperative position and out of said chamber to an operative position, said flash apparatus including, in addition to said reflector, a stationary lamp holder means located in said chamber for supporting a lamp with its axis extending parallel to said reflector when the latter is in said operative position thereof, said lamp holder means extending into said reflector at least when said reflector is in said inoperative position thereof.

5. In a camera, in combination, a camera housing having an upper wall; an enclosure carried by said upper wall of said camera housing and defining with said upper wall a hollow chamber; an elongated, channel-shaped reflector forming part of a flash apparatus; and support means supporting said reflector for movement with respect to said enclosure into said chamber to an inoperative position and out of said chamber to an operative position, said flash apparatus including, in addition to said reflector, a lamp holder means located in said chamber for supporting a lamp with its axis extending parallel to said reflector when the latter is in said operative position thereof, said lamp holder means extending into said reflector at least when said reflector is in said inoperative position thereof, said support means supporting said reflector for longitudinal movement between said positions in directions extending parallel to the axis of a lamp held by said lamp holder means.

6. In a camera, in combination, a camera housing having an upper wall; an enclosure carried by said upper wall of said camera housing and defining with said upper wall a hollow chamber; an elongated, channel-shaped reflector forming part of a flash apparatus; and support means supporting said reflector for movement with respect to said enclosure into said chamber to an inoperative position and out of said chamber to an operative position, said flash apparatus including, in addition to said reflector, a lamp holder means located in said chamber for supporting a lamp with its axis extending parallel to said reflector when the latter is in said operative position thereof, said lamp holder means extending into said reflector at least when said reflector is in said inoperative position thereof, said support means supporting said reflector for turning movement between said positions about an axis perpendicular to the axis of a lamp carried by said lamp holder means.

7. In a camera, in combination, a camera housing having an upper wall; a hollow enclosure carried by said upper wall of said camera housing and defining a chamber with said upper wall; an elongated, channel-shaped reflector; support means located in said chamber and supporting said reflector for longitudinal movement with respect to said enclosure into said chamber to an inoperative position and out of said chamber to an operative position; and lamp-holder means located in said chamber and extending into said reflector for holding a lamp with its axis extending substantially parallel to said reflector, said reflector having an end wall which is spaced from and directed toward said lamp-holder means in said operative position of said reflector so that a lamp can be placed in said reflector and said reflector then moved toward its inoperative position for engaging said lamp with said end wall of said reflector to insert the lamp into said lamp-holder means by movement of said reflector toward said inoperative position thereof.

8. In a camera, in combination, a camera housing having an upper wall; a hollow enclosure carried by said upper wall of said camera housing and defining a chamber with said upper wall; an elongated, channel-shaped reflector; support means located in said chamber and supporting said reflector for longitudinal movement with respect to said enclosure into said chamber to an inoperative position and out of said chamber to an operative position; and lamp-holder means located in said chamber and extending into said reflector for holding a lamp with its axis extending substantially parallel to said reflector, said reflector having an end wall which is spaced from and directed toward said lamp-holder means in said operative position of said reflector so that a lamp can be placed in said reflector and said reflector then moved toward its inoperative position for engaging said lamp with said end wall of said reflector to insert the lamp into said lamp-holder means by movement of said reflector toward said inoperative position thereof, said end wall of said reflector being formed, in its surface which is directed toward said lamp-holder means, with a depression which receives an end portion of a lamp while the lamp is advanced into said lamp-holder means during movement of said reflector toward said inoperative position thereof.

9. In a camera, in combination, a camera housing having an upper wall; a hollow enclosure carried by said upper wall of said camera housing and defining a chamber with said upper wall; an elongated, channel-shaped reflector; support means located in said chamber and supporting said reflector for longitudinal movement with respect to said enclosure into said chamber to an inoperative position and out of said chamber to an operative position; and lamp-holder means located in said chamber and extending into said reflector for holding a lamp with its axis extending substantially parallel to said reflector, said reflector having an end wall which is spaced from and directed toward said lamp-holder means in said operative position of said reflector so that a lamp can be placed in said reflector and said reflector then moved toward its inoperative position for engaging said lamp with said end wall of said reflector to insert the lamp into said lamp-holder means by movement of said reflector toward said inoperative position thereof, said lamp-holder means including a wall formed with an opening for receiving a base of a flash lamp and said wall of said lamp-holder means having a surface directed toward said end wall of said reflector and having an edge located at one end of said opening, said edge being bevelled along at least part of its length for guiding the base of a lamp into said opening during movement of said reflector toward said inoperative position thereof.

10. In a camera, in combination, a camera housing having an upper wall; a hollow enclosure carried by said upper wall of said camera housing and defining a chamber with said upper wall of said camera housing; a reflector forming part of a flash apparatus; support means supporting said reflector for movement with respect to said enclosure into said chamber to an inoperative position and out of said chamber to an operative position, said flash apparatus including, in addition to said reflector, a plurality of stationary components operatively connected to each other and among which are a battery, a lamp holder, a condenser, and a resistor, at least some of said components being located in said chamber and at least one of said components extending into said reflector when the latter is in said inoperative position thereof; and releasable holding means engaging said reflector in at least one of said positions thereof for releasably holding said reflector in said one position thereof.

11. In a camera, in combination, a camera housing having an upper wall; a hollow enclosure carried by said upper wall of said camera housing and defining a chamber with said upper wall of said camera housing; a reflector forming part of a flash apparatus; support means supporting said reflector for movement with respect to said enclosure into said chamber to an inoperative position and out of said chamber to an operative position, said flash apparatus including, in addition to said reflector, a plurality of stationary components operatively connected to each other and among which are a battery, a lamp holder, a condenser, and a resistor, at least some of said components being located in said chamber and at least one of said components extending into said reflector when the latter is in said inoperative position thereof; and spring means engaging said reflector for urging the latter to said operative position thereof.

12. In a camera, in combination, a camera housing having an upper wall; a hollow enclosure carried by said upper wall of said camera housing and defining a chamber with said upper wall of said camera housing; a reflector forming part of a flash apparatus; support means supporting said reflector for movement with respect to said enclosure into said chamber to an inoperative position and out of said chamber to an operative position, said flash apparatus including, in addition to said reflector, a plurality of components operatively connected to each other among which are a battery, a lamp holder, a condenser, and a resistor, at least some of said components being located in said chamber and at least one of said components extending into said reflector when the latter is in said inoperative position thereof, said support means supporting said reflector also for movement beyond said operative position thereof; and ejector means carried by said reflector for ejecting a lamp during movement of said reflector beyond said operative position thereof.

13. In a camera, in combination, a camera housing having an upper wall; a hollow enclosure carried by said upper wall of said camera housing and defining a chamber with said upper wall; a reflector forming part of a flash apparatus; and support means supporting said reflector for movement with respect to said enclosure into said chamber to an inoperative position and out of said chamber to an operative position, said flash apparatus including, in addition to said reflector, a plurality of components operatively connected to each other among which are a battery, a lamp holder, a condenser, and a resistor, and at least some of said components, including said battery, being located in said chamber and at least one of said components extending into said reflector when said reflector is in said inoperative position thereof, said enclosure being movable, at least in part, away from said upper wall of said camera housing to give access to said battery.

14. In a camera, in combination, a camera housing having an upper wall; a hollow enclosure carried by said upper wall of said camera housing and defining a chamber with said upper wall; a reflector forming part of a flash apparatus; and support menas supporting said reflector for movement with respect to said enclosure into said chamber to an inoperative position and out of said chamber to an operative position, said flash apparatus including, in addition to said reflector, a plurality of components operatively connected to each other among which are a battery, a lamp holder, a condenser, and a resistor, and at least some of said components, including said battery, being located in said chamber and at least one of said components extending into said reflector when said reflector is in said inoperative position thereof, said enclosure being movable, at least in part, away from said upper wall of said camera housing to give access to said battery; and releasable holding means engaging at least said part of said enclosure for releasably maintaining the latter in a position closing said chamber and preventing access to said battery.

15. In a camera, in combination, a camera housing having an upper wall; an enclosure carried by said upper wall of said camera housing and defining with said upper wall a hollow chamber; an elongated, channel-shaped reflector forming part of a flash apparatus; and support means supporting said reflector for movement with respect to said enclosure into said chamber to an inoperative position and out of said chamber to an operative position, said flash apparatus including, in addition to said reflector, a plurality of components among which are a battery, a condenser, and a resistor, at least some of said components being located in said chamber and at least one of said components extending into said reflector when said reflector is in said inoperative position thereof, said elongated reflector including a pair of longitudinal sections separate from each other and only one of which is located entirely beyond said chamber in said operative position of said reflector, and said reflector including a leaf spring means connecting said sections of said reflector to each other and urging said one reflector section to an operative position with respect to the other of said reflector sections located at a distance from said other reflector section greater than the distance between said sections when said reflector is in its inoperative position.

16. In a camera, in combination, a camera housing having an upper wall; an enclosure carried by said upper wall of said camera housing and defining with said upper wall a hollow chamber; an elongated, channel-shaped reflector forming part of a flash apparatus; and support means supporting said reflector for movement with respect to said enclosure into said chamber to an inoperative position and out of said chamber to an operative position, said flash apparatus including, in addition to said reflector, a plurality of components among which are a battery, a condenser, and a resistor, at least some of said components being located in said chamber and at least one of said components extending into said reflector when said reflector is in said inoperative position thereof, said elongated reflector including a pair of longitudinal sections separate from each other and only one of which is located entirely beyond said chamber in said operative position of said reflector, and said reflector including a leaf spring means connecting said sections of said reflector to each other and urging said one reflector section to an operative position with respect to the other of said reflector sections located at a distance from said other reflector section greater than the distance between said sections when said reflector is in its inoperative position, said leaf spring means including at least one elongated leaf spring extending longitudinally of said reflector and having opposed side edge portions respectively fixed to said sections of said reflector.

17. In a camera, in combination, a camera housing having an upper wall; an enclosure carried by said upper wall of said camera housing and defining with said upper wall a hollow chamber; an elongated, channel-shaped reflector forming part of a flash apparatus; support means supporting said reflector for movement with respect to said enclosure into said chamber to an inoperative position and out of said chamber to an operative position, said flash apparatus including, in addition to said reflector, a plurality of components among which are a battery, a condenser, and a resistor, at least some of said components being located in said chamber and at least one of said components extending into said reflector when said reflector is in said inoperative position thereof, said elongated reflector including a pair of longitudinal sections separate from each other and only one of which is located entirely beyond said chamber in said operative position of said reflector, and said reflector including a leaf spring means connecting said sections of said reflector to each other and urging said one reflector section to an operative position with respect to the other of said reflector sections located at a distance from said other reflector section greater than the distance between said sections when said reflector is in its inoperative position; and guide means carried by said enclosure and engaging said one reflector section during movement of said reflector from said operative toward said inoperative position for advancing said one reflector section in opposition to said leaf spring means toward said other reflector section upon movement of said reflector from said operative toward said inoperative position thereof.

18. In a camera, in combination, a camera housing having an upper wall; an enclosure carried by said upper wall of said camera housing and defining with said upper wall a hollow chamber; an elongated, channel-shaped reflector forming part of a flash apparatus; support means supporting said reflector for movement with respect to said enclosure into said chamber to an inoperative position and out of said chamber to an operative position, said flash apparatus including, in addition to said reflector, a plurality of components among which are a battery, a condenser, and a resistor, at least some of said components being located in said chamber and at least one of said components extending into said reflector when said reflector is in said inoperative position thereof, said elongated reflector including a pair of longitudinal sections separate from each other and only one of which is located entirely beyond said chamber in said operative position of said reflector, and said reflector including a leaf spring means connecting said sections of said reflector to each other and urging said one reflector section to an operative position with respect to the other of said reflector sections located at a distance from said other reflector section greater than the distance between said sections when said reflector is in its inoperative position; and guide means carried by said enclosure and engaging said one reflector section during movement of said reflector from said operative toward said inoperative position for advancing said one reflector section in opposition to said leaf spring means toward said other reflector section upon movement of said reflector from said operative toward said inoperative position thereof, said guide means including a wall portion of said enclosure formed with an opening through which said one reflector section moves and said wall portion of said enclosure having a bevelled edge engaging said one reflector section to move the latter in opposition to said leaf spring means toward said other reflector section during movement of said reflector from said operative toward said inoperative position thereof.

References Cited by the Examiner

UNITED STATES PATENTS

| | | | |
|---|---|---|---|
| 2,295,071 | 9/1942 | Ansley | 240—2 X |
| 2,395,600 | 2/1946 | Weisglass. | |
| 2,662,968 | 12/1953 | Saraber | 240—1.3 |
| 2,783,696 | 3/1957 | Sewig | 95—11.5 X |
| 2,876,337 | 3/1959 | Fischer | 240—1.3 |
| 3,001,461 | 9/1961 | Irwin | 240—1.3 X |

FOREIGN PATENTS

| | | |
|---|---|---|
| 217,297 | 9/1961 | Australia. |
| 1,076,546 | 4/1954 | France. |
| 1,102,182 | 5/1955 | France. |
| 873,483 | 7/1961 | Great Britain. |
| 875,469 | 8/1961 | Great Britain. |

JOHN M. HORAN, *Primary Examiner.*

NORTON ANSHER, *Examiner.*

W. E. JACKSON, *Assistant Examiner.*